(12) United States Patent
Okura et al.

(10) Patent No.: US 8,067,721 B2
(45) Date of Patent: Nov. 29, 2011

(54) PROJECTION-TYPE IMAGE DISPLAY APPARATUS HAVING A PLANAR REFLECTING ELEMENT AND AN ASPHERICAL REFLECTING ELEMENT WITH BASE-SIDE POSITIONING UNITS INTEGRALLY FORMED ON A BASE

(75) Inventors: Kenichiro Okura, Tokyo (JP); Hidekazu Kodera, Tokyo (JP); Koji Nakanishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 258 days.

(21) Appl. No.: 12/508,601

(22) Filed: Jul. 24, 2009

(65) Prior Publication Data
US 2010/0026971 A1   Feb. 4, 2010

(30) Foreign Application Priority Data

Aug. 1, 2008   (JP) .................................. 2008-200132

(51) Int. Cl.
*H01L 27/00* (2006.01)

(52) U.S. Cl. .................................... 250/208.1; 250/216

(58) Field of Classification Search ............... 250/208.1, 250/216, 239; 353/78, 77, 99, 37, 119; 359/449–459

See application file for complete search history.

(56) References Cited

U.S. PATENT DOCUMENTS 6,752,500 B1 * 6/2004 Yoshii et al. .................... 353/78

FOREIGN PATENT DOCUMENTS

JP            3643810 B2      4/2005

\* cited by examiner

*Primary Examiner* — Que T Le
(74) *Attorney, Agent, or Firm* — Birch, Stewart, Kolasch & Birch, LLP

(57) ABSTRACT

A projection-type image display apparatus includes a first reflecting optical element and a second reflecting optical element that are retained on a base. A base-side first positioning unit and a base-side second positioning unit are formed integrally with the base. The base-side first positioning unit abuts against the first reflecting optical element to define a position of the first reflecting optical element. The base-side second positioning unit abuts against the second reflecting optical element to define a position of the second reflecting optical element.

9 Claims, 6 Drawing Sheets

PROJECTION-TYPE IMAGE DISPLAY APPARATUS HAVING A PLANAR REFLECTING ELEMENT AND AN ASPHERICAL REFLECTING ELEMENT WITH BASE-SIDE POSITIONING UNITS INTEGRALLY FORMED ON A BASE

BACKGROUND OF THE INVENTION

1. Field of the Invention

The present invention relates to a projection-type image display apparatus such as a rear-projection-type television or a video projector that includes a reflection-type image forming element or a transmission-type image forming element.

2. Description of the Related Art

To improve the image quality of a projection-type image display apparatus, it is necessary to achieve high positional accuracy in the arrangement of optical elements such as a lens and a mirror that constitute a projection optical system in the apparatus. It is also important to reduce a deformation in the optical elements caused by thermal expansion or thermal contraction. Particularly, when the optical length between adjacent optical elements in a projection optical system is short, as in the projection-type image display apparatuses, position misalignment or thermal deformation of the optical elements significantly affects the image quality. That is why it is necessary to enhance the positional accuracy and control the thermal deformation of the optical elements.

For example, Japanese Patent No. 3643810 discloses a mirror retention mechanism that is used in retaining a resin mirror in a rear-projection-type graphic display apparatus. In the mirror retention mechanism, a supporting frame supports the resin mirror so that the resin mirror can radially expand or contract with respect to the central portion of its bottom end. Moreover, to reduce the thermal deformation of the resin mirror, a rear-side member is arranged at a distance behind the supporting frame and biasing members are used to elastically bias the resin mirror in an anterior direction of the rear-side member.

To retain a resin mirror at high positional accuracy by using the abovementioned mirror retention mechanism, it is necessary to achieve high manufacturing accuracy for the supporting frame and high assembly accuracy for the mirror retention mechanism. Thus, such a configuration causes an increase in the manufacturing cost of a projection-type image display apparatus, such as a rear-projection-type graphic display apparatus.

SUMMARY OF THE INVENTION

It is an object of the present invention to at least partially solve the problems in the conventional technology.

According to an aspect of the present invention there is provided a projection-type image display apparatus including a projection optical system that includes a first reflecting optical element that has a planar reflecting surface for reflecting an image light in a first direction, and a second reflecting optical element that has an aspherical reflecting surface for reflecting the image light reflected by the first reflecting optical element in a second direction; a base on which the first reflecting optical element and the second reflecting optical element are retained; a base-side first positioning unit that abuts against the first reflecting optical element to define a position of the first reflecting optical element; and a base-side second positioning unit that abuts against the second reflecting optical element to define a position of the second reflecting optical element, wherein the base-side first positioning unit and the base-side second positioning unit are formed integrally with the base.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
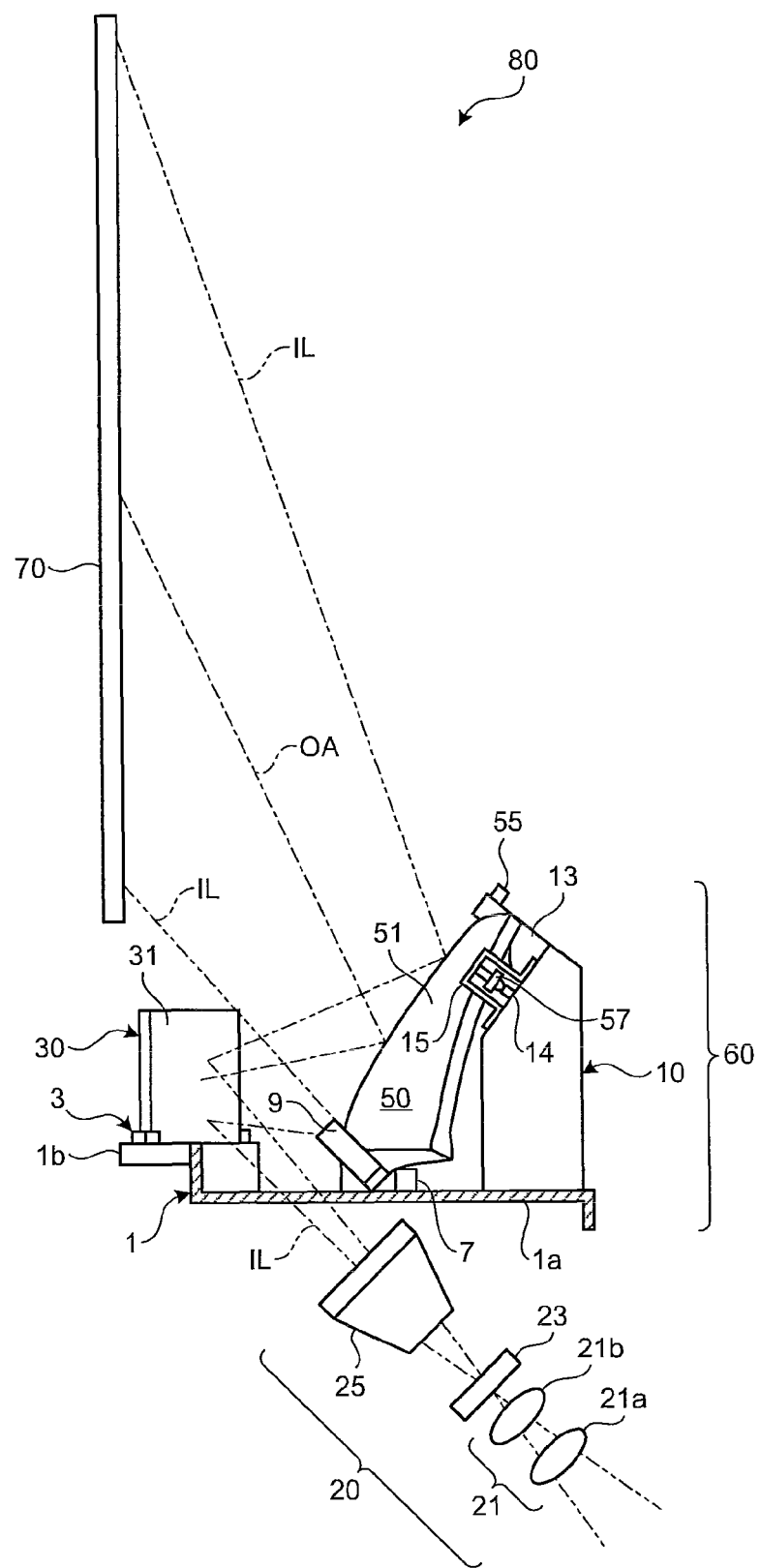
FIG. 1 is a partial cross-sectional view of an exemplary configuration of a projection-type image display apparatus according to an embodiment of the present invention.
Figure 2:
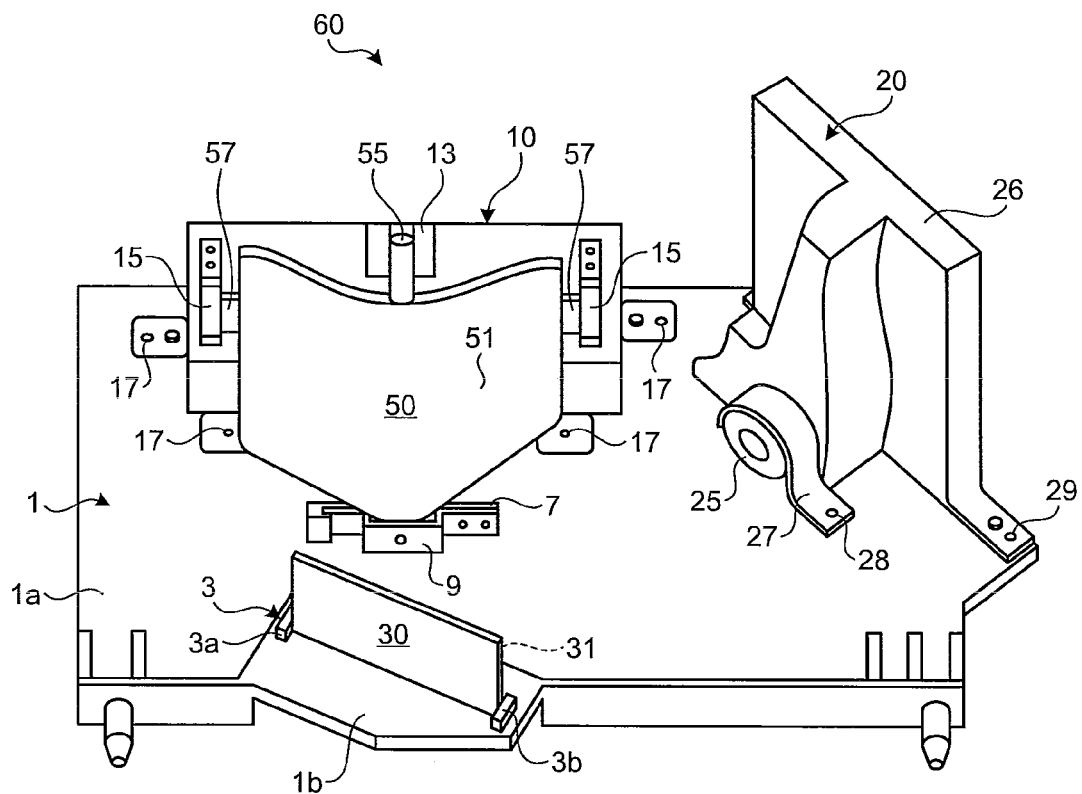
FIG. 2 is a perspective view of a projection optical system shown in FIG. 1.

FIG. 1 is a partial cross-sectional view of an exemplary configuration of a projection-type image display apparatus 80 according to an embodiment of the present invention. FIG. 2 is a perspective view of a projection optical system 60 arranged inside the projection-type image display apparatus 80. The projection-type image display apparatus 80 includes a base 1, a lighting unit 20 retained on the base 1, a first reflecting optical element 30, a second reflecting optical element 50, and a screen 70. The first reflecting optical element 30 and the second reflecting optical element 50 constitute the projection optical system 60.

An image light IL output by the lighting unit 20 sequentially reflects from a reflecting surface 31 of the first reflecting optical element 30 and a reflecting surface 51 of the second reflecting optical element 50 and gets projected on a back surface of the screen 70. Except for the screen 70, all the constituent elements of the projection-type image display apparatus 80 are placed in a device housing (not shown). The screen 70 is fixed in a screen frame (not shown) and arranged at a window portion of the device housing.

As shown in FIGS. 1 and 2, the base 1 includes a main flat member 1a and a stage member 1b. The stage member 1b is raised to a higher level than the main flat member 1a. A base-side first positioning unit 3 that defines the position of the first reflecting optical element 30 is arranged on the stage member 1b. The base-side first positioning unit 3 includes, but is not limited to, four protrusions. Only two of the protrusions, namely, protrusions 3a and 3b can be seen in FIG. 2; however, all the protrusions, namely, protrusions 3a, 3b, 3c, and 3d can be seen in FIG. 3. A base-side second positioning unit 7 that defines the position of the second reflecting optical element 50 is arranged on and near the center of the main flat member 1a.

A retaining unit 10 is arranged on the main flat member 1a behind the base-side second positioning unit 7. The retaining unit 10 enables adjusting a tilt of the second reflecting optical element 50. More particularly, the retaining unit 10 includes a base-side guiding member 13 that engages with an element-side guiding member 55 of the second reflecting optical element 50, a tilt adjusting member 14 (see FIG. 1) that is arranged corresponding to an attaching unit 57 provided on each lateral side of the second reflecting optical element 50, and a biasing unit 15 that is arranged corresponding to each tilt adjusting member 14 and that elastically biases the corresponding tilt adjusting member 14 to the corresponding attaching unit 57. Each tilt adjusting member 14 is used to change the position of the corresponding attaching unit 57. Thus, with the element-side guiding member 55 and the base-side guiding member 13 mutually engaged, the tilt of the second reflecting optical element 50 can be adjusted by changing the position of each attaching unit 57 with the use of the corresponding tilt adjusting member 14. Meanwhile, the retaining unit 10 is fixed to the main flat member 1a by four screws (although the number of such screws is not limited to four).

The lighting unit 20 includes a light source unit (not shown) that emits light, a light collection optical system 21 that gathers the light emitted by the light source unit, an image forming element 23 that forms the light image IL by performing spatial modulation on the light gathered by the light collection optical system 21, a projection lens 25 (see FIG. 1) that magnifies the image light IL, and a lighting unit housing 26 (see FIG. 2) that houses the constituent elements of the lighting unit 20. The light source of the light source unit can be a lamp light source, a laser light source, or a light-emitting diode (LED) light source. If a laser light source or an LED light source is used as the light source, then an optical fiber is used to transmit the emitted light to the light collection optical system 21. As a matter of practical convenience in the example shown in FIG. 1, the light collection optical system 21 includes two lenses 21a and 21b. The image forming element 23 can be a transmission-type image forming element (e.g., liquid crystal panel) or a reflection-type image forming element (e.g., digital micromirror device (DMD)).

The light collection optical system 21 and the image forming element 23 are housed in entirety in the lighting unit housing 26. The projection lens 25 is partially housed in the lighting unit housing 26 with the light outgoing surface of the projection lens 25 positioned outside the lighting unit housing 26. The projection lens 25 is fixed to the main flat member 1a by a fixture member 27 and a screw 28. The lighting unit housing 26 is fixed to the main flat member 1a by a screw 29. The image light IL output by the lighting unit 20 falls on the projection optical system 60, which magnifies the incident image light IL and projects the magnified image light IL on the screen 70.

As described above, the projection optical system 60 includes the first reflecting optical element 30 that has the reflecting surface 31 in planar shape, and the second reflecting optical element 50 that has the reflecting surface 51 in aspherical shape. The position of the first reflecting optical element 30 is defined by the base-side first positioning unit 3 arranged on the stage member 1b. A retaining unit 40 (not shown in FIGS. 1 and 2) is used in fixing the first reflecting optical element 30 on the stage member 1b. Similarly, the position of the second reflecting optical element 50 is defined by the base-side second positioning unit 7 arranged on the main flat member 1a. A fixture unit 9 and the retaining unit 10 are used in fixing the second reflecting optical element 50 at a predetermined position on the main flat member 1a.

The image light IL output by the lighting unit 20 reflects from the reflecting surface 31 of the first reflecting optical element 30 toward the second reflecting optical element 50 and subsequently reflects from the reflecting surface 51 of the second reflecting optical element 50 to fall on the back surface of the screen 70. Meanwhile, an optical axis OA of the projection optical system 60 is shown by a dashed-dotted line in FIG. 1.

A feature of the projection-type image display apparatus 80 lies in the technique of retaining and fixing the first reflecting optical element 30 and the second reflecting optical element 50 on the base 1. From that perspective, first, the configuration of the base 1 is described below with reference to FIG. 3. The technique of retaining and fixing the first reflecting optical element 30 and the second reflecting optical element 50 on the base 1 is described with reference to FIGS. 4 to 8. Meanwhile, the constituent elements that have already appeared in the description with reference to FIGS. 1 and 2 and that also appear in the following description with reference to FIGS. 3 to 8 are referred to by the same reference numerals for clarity and their explanation will not be repeated here.

Figure 3:
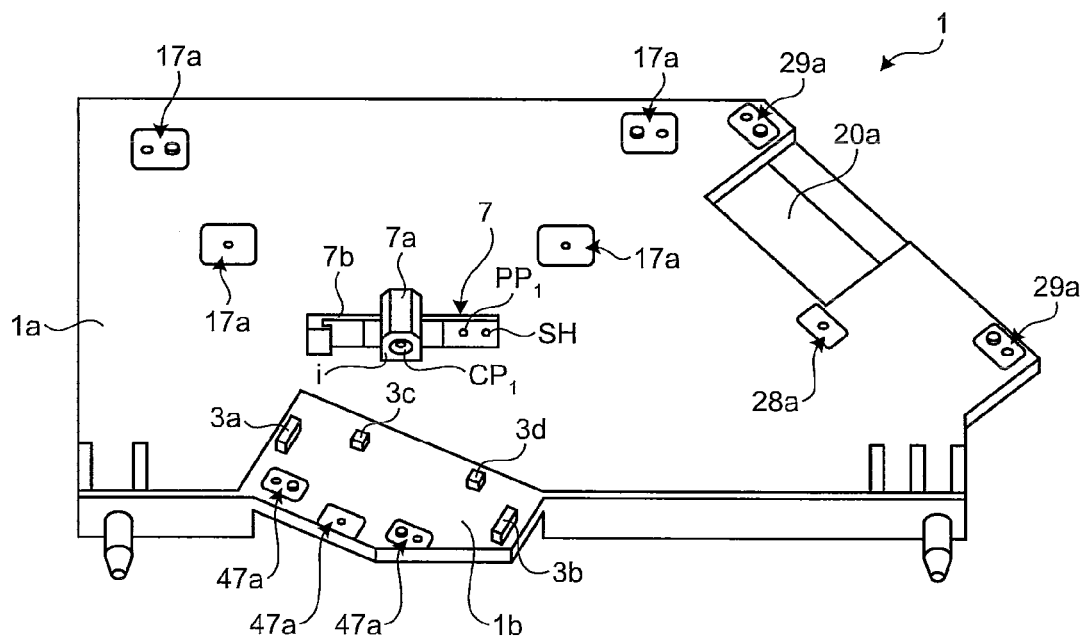
FIG. 3 is a perspective view of a base shown in FIG. 1.

FIG. 3 is a perspective view of the base 1. However, the retaining unit 10 is omitted from FIG. 3 for clarity. As shown in FIG. 3, the base-side first positioning unit 3 includes, but is not limited to, four protrusions 3a to 3d. Each of the protrusions 3a to 3d is rectangular solid in shape and has a planar side surface that abuts against an outer surface of the first reflecting optical element 30, (see FIG. 1). A side surface of one of the protrusions 3a and 3d abut against the bottom part of a side surface of the first reflecting optical element 30, and side surfaces of the protrusions 3c and 3d abut against the bottom part of the front surface of the first reflecting optical element 30.

To facilitate fixing of the first reflecting optical element 30, which is positioned with the use of the base-side first positioning unit 3, on the stage member 1b, three of holding members 47a are arranged on the near side of the stage member 1b (front side of the projection-type image display apparatus in FIG. 1). The three holding members 47a are used for fixing the retaining unit 40 (not shown in FIGS. 1 to 3) of the first reflecting optical element 30 on the stage member 1b.

The base-side second positioning unit 7 arranged on the main flat member 1a includes a primary positioning member 7a and a secondary positioning member 7b. The primary positioning member 7a has an inclined surface I with a rising gradient from the side of the stage member 1b toward the arrangement area side of the retaining unit 10 (see FIGS. 1 and 2). A mortar-shaped recess $CP_1$ is formed on the inclined surface I. The secondary positioning member 7b lies perpendicular to the primary positioning member 7a when seen in a planar view. On one end in the longitudinal direction of the secondary positioning member 7b, a groove G is formed into which fits one end of the fixture unit 9, which is used in fixing the second reflecting optical element 50 (see FIG. 1 or FIG. 2). On the other end in the longitudinal direction of the secondary positioning member 7b, a screw hole SH and a positioning protrusion $PP_1$ are formed. The other end of the fixture unit 9 is threadably fixed into the screw hole SH.

To facilitate fixing of the retaining unit 10 (see FIG. 1 or FIG. 2) to the main flat member 1a, four holding members 17a are arranged around the arrangement position of the retaining unit 10. Similarly, to facilitate fixing of the lighting unit 20 (see FIG. 1 or FIG. 2) to the main flat member 1a, a recess 20a is formed in which the bottom part of the lighting unit 20 fits. Around the recess 20a, a holding member 28a (screw hole) is formed for fixing the fixture member 27 (see FIG. 2) of the projection lens 25 and two holding members 29a are formed for fixing the lighting unit housing 26 by the screw 29 (see FIG. 2).

The base 1 is manufactured by performing a molding process on a metal such as aluminum or magnesium, or on synthetic resin. Alternatively, it is also possible to manufacture the base 1 by performing cutting processing on, e.g., a metal sheet or aluminum sheet. Upon obtaining a predetermined molded shape of the base 1, the base-side first positioning unit 3 and the base-side second positioning unit 7 can be manufactured by performing cutting processing on the base 1.

In any of the abovementioned manufacturing techniques for manufacturing the base 1, the main flat member 1a and the stage member 1b are integrally molded into a single piece. Consequently, the base-side first positioning unit 3 and the base-side second positioning unit 7 are integrally molded with the base 1. More particularly, the base-side first positioning unit 3 and the base-side second positioning unit 7 are integrally molded with the constituent material of the base 1. The retaining unit 10 can be manufactured in an independent manner before being fixed on the main flat member 1a, or it can be integrally molded with the main flat member 1a and the stage member 1b as a single piece.

Figure 4:
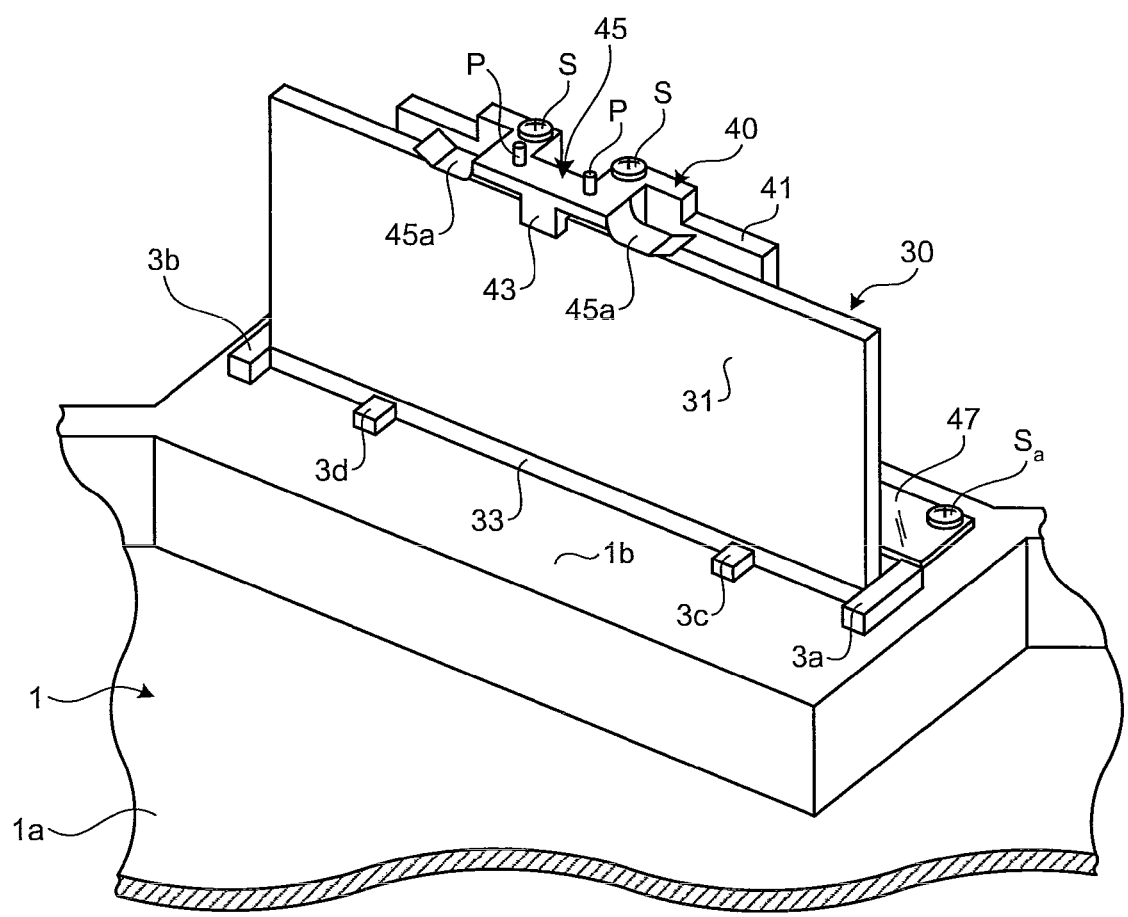
FIG. 4 is a perspective view of a first reflecting optical element shown in FIG. 1.

FIG. 4 is a magnified perspective view of the first reflecting optical element 30. As shown in FIG. 4, the position of the first reflecting optical element 30 on the stage member 1b is defined by the base-side first positioning unit 3. Once arranged in the defined position, the first reflecting optical element 30 is retained and fixed on the stage member 1b by using the retaining unit 40. In the example shown in FIG. 4, a protective tape 33 is attached to the bottom part of the first reflecting optical element 30 to protect it from getting cracks or from chipping.

As described above, in the base-side first positioning unit 3, a side surface of one of the protrusions 3a and 3b abuts against the bottom part of a side surface of the first reflecting optical element 30, and side surfaces of the protrusions 3c and 3d abut against the bottom part of the front surface of the first reflecting optical element 30. When the position of the first reflecting optical element 30 is defined by the base-side first positioning unit 3, the retaining unit 40 is used to hold the first reflecting optical element 30 in a position-variable manner in the longitudinal direction and the thickness direction.

The retaining unit 40 includes a main plate 41, an engaging member 43, a pressing member 45, and four fixture units 47 (only one fixture unit 47 can be seen in FIG. 4). The main plate 41 is positioned parallel to the back surface of the first reflecting optical element 30. The engaging member 43 is positioned above the main plate 41 and protrudes toward the first reflecting optical element 30. The pressing member 45 is fixed to the engaging member 43 with the use of two screws S and two pins P. The four fixture units 47 are used for fixing the main plate 41 to the stage member 1b. The engaging member 43 engages with the top surface of the first reflecting optical element 30. The pressing member 45 abuts against the top surface of the first reflecting optical element 30, and includes springs 45a for pressing the first reflecting optical element 30 toward the stage member 1b.

After defining or while defining the position of the first reflecting optical element 30 by using the base-side first positioning unit 3, the engaging member 43 of the retaining unit 40 is engaged with the top surface of the first reflecting optical element 30, and each of the fixture units 47 is fixed into one of the holding members 47a (see FIG. 3) by screws $S_a$ (one of which can be seen in FIG. 4). As a result, the first reflecting optical element 30 is retained and fixed on the stage member 1b. In this configuration, because the position of the first reflecting optical element 30 gets defined when the front surface thereof abuts against the protrusions 3c and 3d, the thickness error of the first reflecting optical element 30 does not affect the positioning. As a result, as compared to a configuration in which the positioning is determined with reference to the rear side of the first reflecting optical element 30, it becomes easier to fix the first reflecting optical element 30 on the stage member 1b with a higher positional accuracy.

Figure 5A:
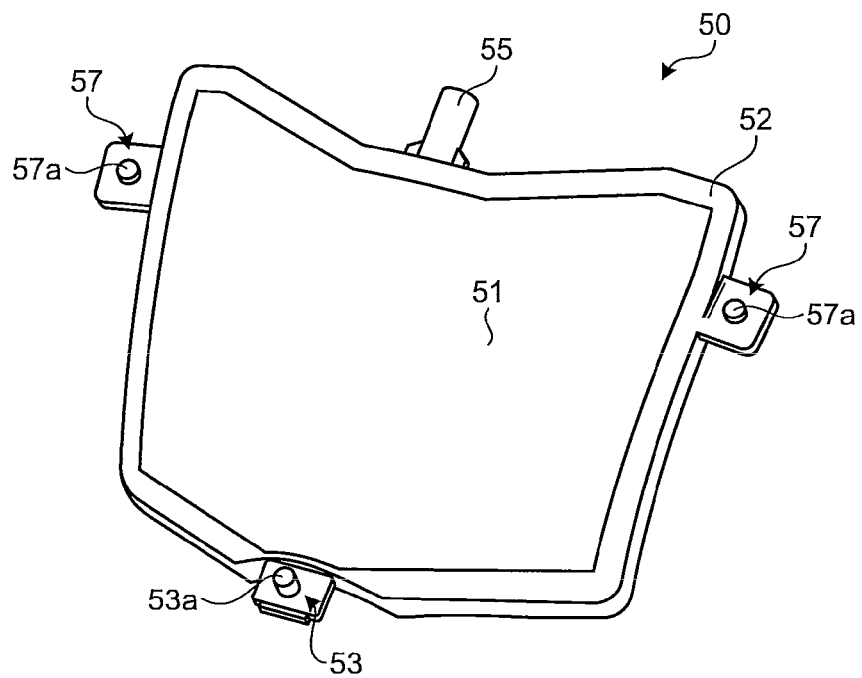
FIG. 5A is a front perspective view of a second reflecting optical element shown in FIG. 1.
Figure 5B:
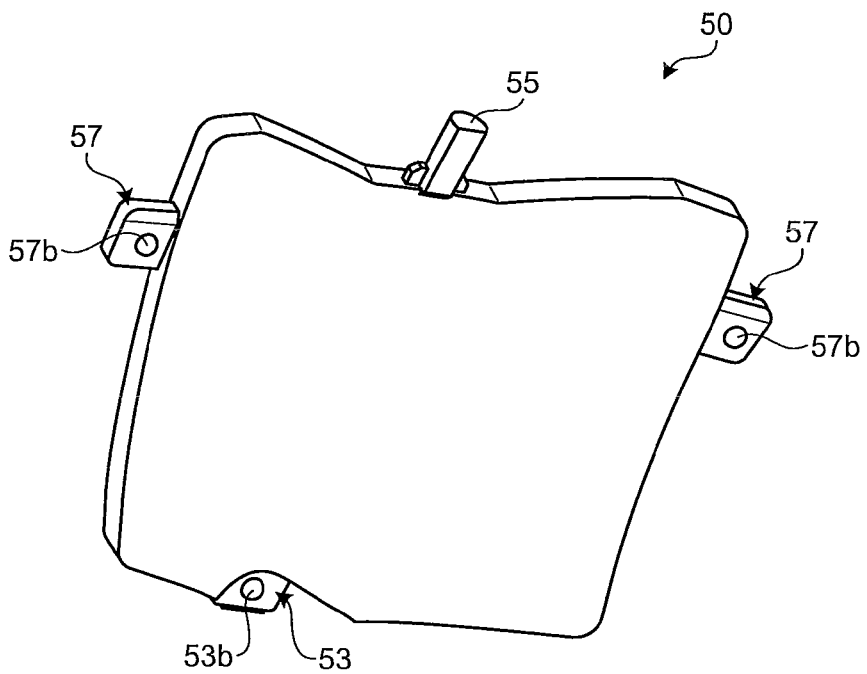
FIG. 5B is a rear perspective view of the second reflecting optical element shown in FIG. 5A.

FIG. 5A is a front perspective view of the second reflecting optical element 50, and FIG. 5B is a rear perspective view of the second reflecting optical element 50. As shown in FIG. 5A, the second reflecting optical element 50 includes the aspherical reflecting surface 51 and a periphery member 52 surrounding the reflecting surface 51. Moreover, as shown in FIGS. 5A and 5B, an element-side positioning member 53 is arranged at the bottom end of the second reflecting optical element 50, the element-side guiding member 55 is arranged at the top end of the second reflecting optical element 50, and attaching units 57 protruding externally in the width direction are arranged on both lateral sides of the second reflecting optical element 50. The element-side guiding member 55 and the attaching units 57 function as tilt adjusting units for varying the tilt of the second reflecting optical element 50. Because of that, it becomes possible to adjust the angle of reflection of the image light IL within the vertical surface that includes the optical axis OA of the projection optical system 60.

The element-side positioning member 53 includes a columnar protrusion 53a that protrudes on the front side of the second reflecting optical element 50, and a hemispheroid protrusion 53b that protrudes on the rear side of the second reflecting optical element 50. The element-side guiding member 55 is columnar in shape. Each of the attaching units 57 includes a columnar protrusion 57a that protrudes on the front side of the second reflecting optical element 50, and a hemispheroid protrusion 57b that protrudes on the rear side of the second reflecting optical element 50. The second reflecting optical element 50 is positioned in such a way that the element-side positioning member 53 and the element-side guiding member 55 are bisected by the vertical surface including the optical axis OA of the projection optical system 60 (see FIG. 1). The second reflecting optical element 50 is then retained and fixed on the base 1 by the fixture unit 9 and the biasing units 15 (see FIG. 2).

One technique of manufacturing the reflecting surface 51 of the second reflecting optical element 50 is to polish or etch a predetermined portion of a molded material of a metal or an alloy into a mirror finished surface. Alternatively, another technique is to apply or vapor-deposit a metal film such as an aluminum film on a predetermined portion of a molded material of synthetic resin.

Figure 6:
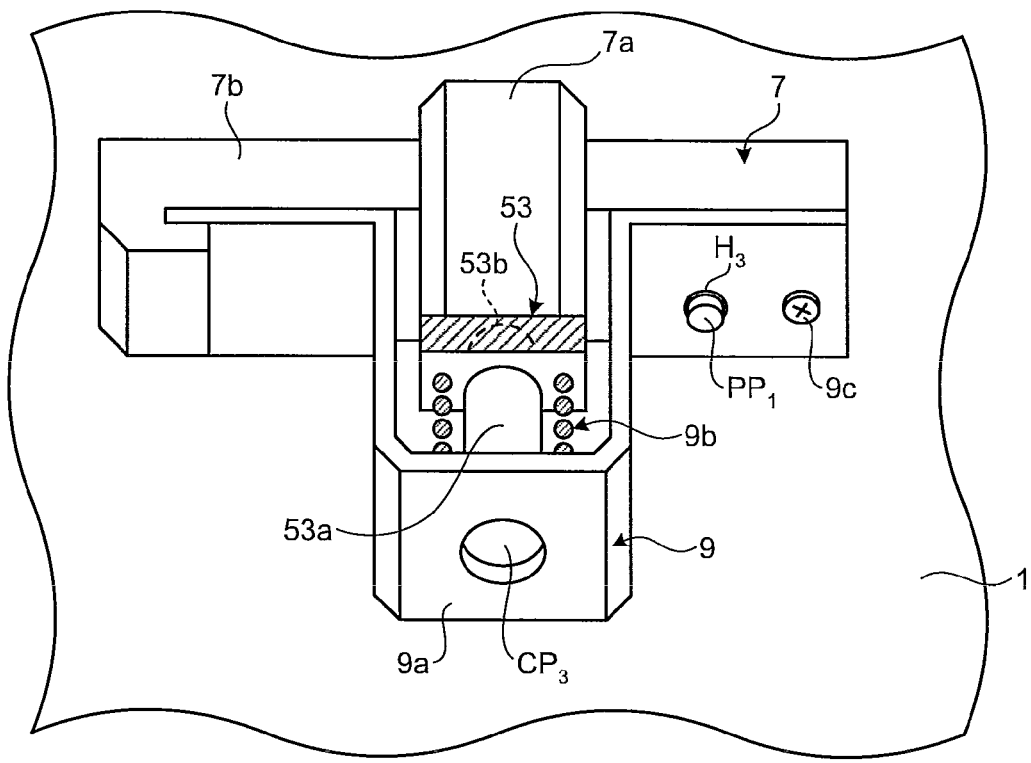
FIG. 6 is a perspective view of a situation where an element-side positioning unit of the second reflecting optical element is fixed to a base-side second positioning unit by a fixture unit.
Figure 7:
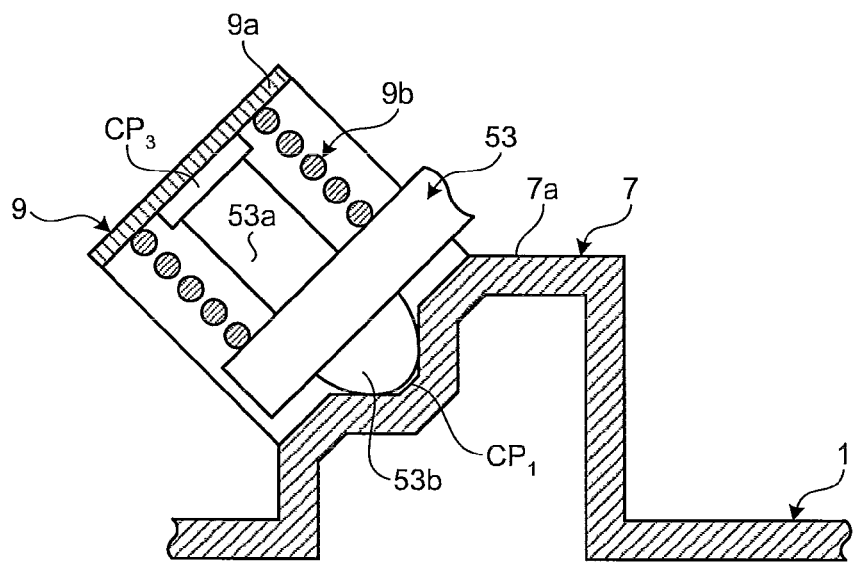
FIG. 7 is a partial cross-sectional view of a situation where the element-side positioning unit of the second reflecting optical element is fixed to the base-side second positioning unit by the fixture unit.
Figure 8:
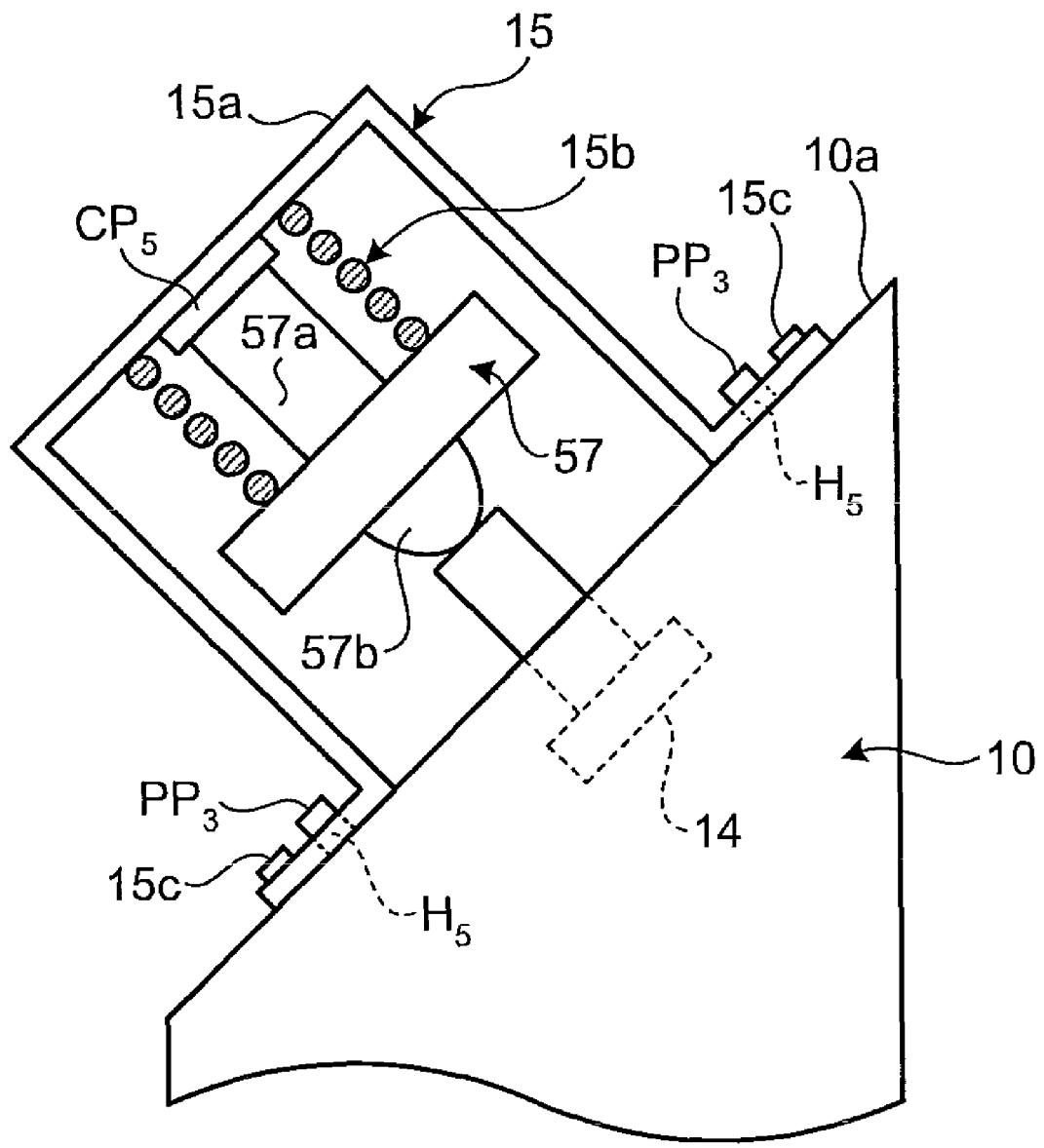
FIG. 8 is a partial cross-sectional side view of a situation where an attaching member is fixed to a retaining unit of the second reflecting optical element by using a biasing member.

FIG. 6 is a perspective view of a situation in which the element-side positioning member 53 of the second reflecting optical element 50 is fixed to the base-side second positioning unit 7 by the fixture unit 9. FIG. 7 is a partial cross-sectional view of a situation in which the element-side positioning member 53 of the second reflecting optical element 50 is fixed to the base-side second positioning unit 7 by the fixture unit 9. FIG. 8 is a partial cross-sectional side view of a situation when an arbitrary one of the attaching units 57 is fixed to the retaining unit 10 by the corresponding biasing unit 15.

As shown in FIG. 6, the fixture unit 9 includes a fixture body 9a, an elastic member 9b that is a coil spring (hereinafter, "coil spring 9b"), and a fixing screw 9c. A recess $CP_3$ is formed on the front surface of the fixture body 9a, and a positioning hole $H_3$ is formed on one end in the longitudinal direction of the fixture body 9a. Meanwhile, as described above, the base-side second positioning unit 7 includes the primary positioning member 7a and the secondary positioning member 7b.

The fixture body 9a is arranged to cover the lateral surfaces of the primary positioning member 7a, the front surface of the secondary positioning member 7b, and the front surface of the element-side positioning member 53 (i.e., the surface on the side of the stage member 1b in FIG. 2) that is in engagement with the primary positioning member 7a. The fixing screw 9c is used to fix the fixture body 9a to the base-side second positioning unit 7. One end of the fixture body 9a fits in the groove G formed on the base-side second positioning unit 7. The positioning protrusion $PP_1$ of the base-side second positioning unit 7 fits in the positioning hole $H_3$. The coil spring 9b is arranged between the fixture body 9a and the element-side positioning member 53, and around the columnar protrusion 53a of the element-side positioning member 53. The fixing screw 9c is threaded into the screw hole SH (see FIG. 3) formed on the secondary positioning member 7b.

When the element-side positioning member 53 is fixed to the base-side second positioning unit 7 by the fixture unit 9, the hemispheroid protrusion 53b of the element-side positioning member 53 abuts against the inner circumference of the mortar-shaped recess $CP_1$, which is formed on the primary positioning member 7a (see FIG. 7). Moreover, as described above, the coil spring 9b is arranged between the fixture body 9a and the element-side positioning member 53 to surround the columnar protrusion 53a. As a result, the element-side positioning member 53 forms a pivot structure with the base-side second positioning unit 7, and is retained and fixed on the base-side second positioning unit 7 in a biased manner because of the biasing force of the coil spring 9b.

As shown in FIG. 8, the attaching unit 57 (see FIGS. 5A and 5B) is fixed to the retaining unit 10 by the corresponding biasing unit 15 and the corresponding tilt adjusting member 14. Each of the biasing units 15 includes a biasing body 15a, an elastic member 15b that is a coil spring (hereinafter, "coil spring 15b"), and two fixing screws 15c. Two positioning holes $H_5$ are formed on the biasing body 15a.

The biasing body 15a is arranged across the corresponding attaching unit 57 and is fixed to a top surface 10a of the retaining unit 10 by the fixing screws 15c. Positioning protrusions $PP_3$ formed on the top surface 10a fit in the positioning holes $H_5$ on the biasing body 15a. The coil spring 15b is arranged between the biasing body 15a and the corresponding attaching unit 57, and around the columnar protrusion 57a of the corresponding attaching unit 57. The fixing screws 15c are threaded into screw holes (not shown) that are formed on the top surface 10a of the retaining unit 10.

It is desirable that each tilt adjusting member 14 is made of a screw having a flat surface tip, although this is not strictly necessary. The tilt adjusting member 14 is threaded into the top surface 10a from the underside surface of the retaining unit 10 such that the tip of the tilt adjusting member 14 abuts against the hemispheroid protrusion 57b of the corresponding attaching unit 57. Any variation in the threading depth of the tilt adjusting member 14 causes a change in the amount of elastic deformation of the coil spring 15b. That in turn causes a change in the position of the corresponding attaching unit 57, with the tip of the tilt adjusting member 14 in contact with the hemispheroid protrusion 57b. Thus, it is possible to adjust the tilt of the second reflecting optical element 50 even after fixing the biasing body 15a to the retaining unit 10. In that case, the element-side guiding member 55 of the second reflecting optical element 50 (see FIGS. 5A and 5B) remains engaged with the base-side guiding member 13 (see FIGS. 1 and 2), but changes its position along the vertical surface including the optical axis OA of the projection optical system 60. Meanwhile, the base-side guiding member 13 has a groove in which the element-side guiding member 55 fits.

In this way, in the projection-type image display apparatus 80 (see FIG. 1) in which the first reflecting optical element 30 and the second reflecting optical element 50 are retained and fixed on the base 1 in the manner described with reference to FIGS. 3 to 8, the base-side first positioning unit 3 and the base-side second positioning unit 7 (see FIG. 3) are integrally molded with the base 1. Thus, the positional accuracy of the first reflecting optical element 30 and the second reflecting optical element 50 (see FIG. 2) depends only on the degree of accuracy of the base 1, the first reflecting optical element 30, and the second reflecting optical element 50.

For that reason, the number of factors that can reduce the positional accuracy of the first reflecting optical element 30 and the second reflecting optical element 50 is far less than, e.g., the mirror retention mechanism disclosed in Japanese Patent No. 3643810. As a result, it becomes easier to enhance the positional accuracy of the first reflecting optical element 30 and the second reflecting optical element 50, as well as reduce the manufacturing cost of the projection-type image display apparatus 80. That facilitates manufacturing of the projection-type image display apparatus 80 with high quality and at a high yield.

Moreover, as described above, the base-side first positioning unit 3 includes the protrusions 3a to 3d that define the position of the first reflecting optical element 30. More particularly, a side surface of one of the protrusions 3a and 3b abuts against the bottom part of a side surface of the first reflecting optical element 30, and side surfaces of the protrusions 3c and 3d abut against the bottom part of the front surface of the first reflecting optical element 30. Because of such a configuration (see FIGS. 3 and 4), the first reflecting optical element 30 remains position-variable when subjected to, e.g., thermal stress after being retained and fixed on the base 1.

Similarly, as described above, the element-side positioning member 53 of the second reflecting optical element 50 forms a pivot structure with the base-side second positioning unit 7, and each attaching unit 57 is fixed to the retaining unit 10 by the corresponding biasing unit 15 of the retaining unit 10. Because of such a configuration (see FIGS. 7 and 8), the second reflecting optical element 50 remains position-variable when subjected to, e.g., thermal stress after being retained and fixed on the base 1. Consequently, in the projection-type image display apparatus 80, there is less deformation in the first reflecting optical element 30 and the second reflecting optical element 50 caused by thermal expansion or thermal contraction. That also facilitates manufacturing of the projection-type image display apparatus 80 at a high quality.

Furthermore, because the fixture unit 9 includes the coil spring 9b and each biasing unit 15 includes the coil spring 15b, the second reflecting optical element 50 is constantly elastically biased toward the base-side second positioning unit 7 and the retaining unit 10. That enables the second reflecting optical element 50 to immediately restore to a stable position upon being subjected to an external force.

Moreover, as described above, the attaching units 57 are fixed to the retaining unit 10 by the biasing units 15, and the retaining unit 10 includes the tilt adjusting member 14 (see FIG. 8) for determining the position and the tilt of the second reflecting optical element 50. Such a configuration makes it possible to enhance the positional accuracy as compared to a configuration in which the position of the second reflecting optical element 50 is defined only by the base-side second positioning unit 7.

Furthermore, as described above, the bottom end of each of the first reflecting optical element 30 and the second reflecting optical element 50 is directly fixed on the base 1. Such a configuration makes it possible to reduce the height of the base 1 such that the manufacturing cost decreases and the transportation efficiency enhances.

Meanwhile, although the configuration of the projection-type image display apparatus 80 is described according to the exemplary embodiment of the present invention, the configuration is not limited to the exemplary embodiment. More particularly, as long as the base-side first positioning unit 3 that defines the position of the first reflecting optical element 30 and the base-side second positioning unit 7 that defines the position of the second reflecting optical element 50 are integrally molded with the base 1, the shape of the base-side first positioning unit 3 and the base-side second positioning unit 7 can be suitably modified.

However, it is desirable that the shape of the base-side first positioning unit 3 is selected so that the first reflecting optical element 30 remains position-variable when subjected to, e.g., thermal stress after being retained and fixed on the base 1. That helps reduce the deformation of the first reflecting optical element 30. Similarly, it is desirable that the shape of the base-side second positioning unit 7 is selected so that the second reflecting optical element 50 remains position-variable after being retained and fixed on the base 1 and remains tilt-variable when subjected to, e.g., thermal stress. That helps reduce the deformation of the second reflecting optical element 50.

In the projection-type image display apparatus 80, although a protective tape 33 could be attached to the bottom part of the first reflecting optical element 30 as shown in FIG. 4, this is not strictly necessary. Alternatively, a non-adherent protective material (e.g., a shock-absorbing material) can be applied to the first reflecting optical element 30. Moreover, the configuration of the retaining unit 40, by which the first reflecting optical element 30 is retained and fixed on the base 1, can be suitably modified.

Meanwhile, it is also possible to determine whether to configure the projection-type image display apparatus 80 to enable tilt adjustment of the second reflecting optical element 50. According to the embodiment, the tilt adjusting units (the element-side guiding member 55 and the attaching units 57) in the second reflecting optical element 50 enable the tilt adjustment. In that case, for example, a lubricant agent can be applied to the area over which the element-side guiding member 55 abuts against the base-side guiding member 13 (see FIG. 2) or to the area over which each attaching unit 57 abuts against the corresponding tilt adjusting member 14 (see FIG. 8) to make the tilt adjustment easier. Moreover, because application of external force or thermal stress causes a relatively easier position change of the second reflecting optical element 50, it becomes easier to reduce the deformation of the second reflecting optical element 50. Furthermore, to facilitate the tilt adjustment, it is desirable to use a narrow-pitch screw as the tilt adjusting member 14.

Meanwhile, the technical effect of applying a lubricant agent can also be achieved by using fluorine-contained resin to manufacture at least one of the components that mutually abut, thus enabling the tilt adjustment. Alternatively, the technical effect can be achieved by using the fluorine-contained resin to coat at least one of the components. Moreover, when using a screw as the tilt adjusting member 14, the screw can be directly threaded into the retaining unit 10, or into a screw hole formed on a separate component that is arranged on the retaining unit 10.

Furthermore, both ends in the longitudinal direction of the fixture unit 9, which is used for fixing the element-side positioning member 53 of the second reflecting optical element 50 to the base-side second positioning unit 7, can be threadably fixed to the base-side first positioning unit 3. The same can be said for the biasing units 15 that are used for fixing the attaching units 57 of the second reflecting optical element 50 to the retaining unit 10.

In this way, according to an aspect of the present invention, because the base-side first positioning unit and the base-side second positioning unit are formed integrally with a base, the positioning accuracy of first and second reflecting optical elements depends only on the degree of accuracy of the base (including each positioning unit), the first reflecting optical element, and the second reflecting optical element. The number of factors that can reduce the positional accuracy of each reflecting optical element is far less than, e.g., the mirror retention mechanism disclosed in Japanese Patent No. 3643810. As a result, a projection-type image display apparatus of high quality can be easily manufactured at a high yield.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection-type image display apparatus comprising:
   a projection optical system that includes
   a first reflecting optical element that has a planar reflecting surface for reflecting an image light in a first direction, and
   a second reflecting optical element that has an aspherical reflecting surface for reflecting the image light reflected by the first reflecting optical element in a second direction;
   a base on which the first reflecting optical element and the second reflecting optical element are retained;
   a base-side first positioning unit that abuts against the first reflecting optical element to define a position of the first reflecting optical element; and
   a base-side second positioning unit that abuts against the second reflecting optical element to define a position of the second reflecting optical element, wherein
   the base-side first positioning unit and the base-side second positioning unit are formed integrally with the base.

2. The projection-type image display apparatus according to claim 1, wherein the base-side first positioning unit includes a plurality of protrusions each having a planar side surface that abuts against an outer surface of the first reflecting optical element.

3. The projection-type image display apparatus according to claim 1, wherein the base-side second positioning unit includes a mortar-shaped recess, and the second reflecting optical element includes an element-side positioning unit having a hemispheroid protrusion that abuts against an inner circumference of the mortar-shaped recess and forms a pivot structure with the mortar-shaped recess.

4. The projection-type image display apparatus according to claim 3, wherein the element-side positioning unit is arranged at a bottom end of the second reflecting optical element.

5. The projection-type image display apparatus according to claim 1, wherein the base includes a retaining unit that is arranged at a back of the base-side second positioning unit and retains the second reflecting optical element in a tilt-variable manner, the second reflecting optical element includes a plurality of tilt adjusting units that engage with the retaining unit and are retained in a tilt-variable manner by the retaining unit, and an angle of reflection of the image light is adjustable within a vertical surface that includes an optical axis of the projection optical system by varying a tilt of the second reflecting optical element.

6. The projection-type image display apparatus according to claim 5, wherein the tilt adjusting units include an element-side guiding member that is arranged at a top end of the second reflecting optical element and is bisected by the vertical surface including the optical axis; and attaching units that are arranged on both lateral sides of the second reflecting optical element and protrude externally in a width direction of the second reflecting optical element, the retaining unit includes a base-side guiding member that engages with the element-side guiding member;

tilt adjusting members that are arranged in abutted manner with respect to the attaching units, each tilt adjusting member arranged to vary a position of the corresponding attaching unit; and biasing units that elastically bias the attaching units to the corresponding tilt adjusting members, and with the element-side guiding member and the base-side guiding member mutually engaged, the tilt of the second reflecting optical element is adjustable by using at least one of the tilt adjusting members to vary the position of corresponding attaching unit.

7. The projection-type image display apparatus according to claim 6, wherein a lubricant agent is applied to an area over which the attaching unit and corresponding tilt adjusting member mutually abut.

8. The projection-type image display apparatus according to claim 1, wherein a protective tape is attached to a portion of the first reflecting optical element where the base-side first positioning unit abuts.

9. The projection-type image display apparatus according to claim 1, wherein each of the first reflecting optical element and the second reflecting optical element remains retained on the base in a position-variable manner when subjected to stress.

* * * * *